Oct. 8, 1957

W. E. MILLER 2,809,054

COUPLING AND RETRACTABLE TRAILER SUPPORT
AND ACTUATING MEANS THEREFOR

Filed Nov. 22, 1954

INVENTOR.
WELLINGTON E. MILLER
BY
ATTORNEY.

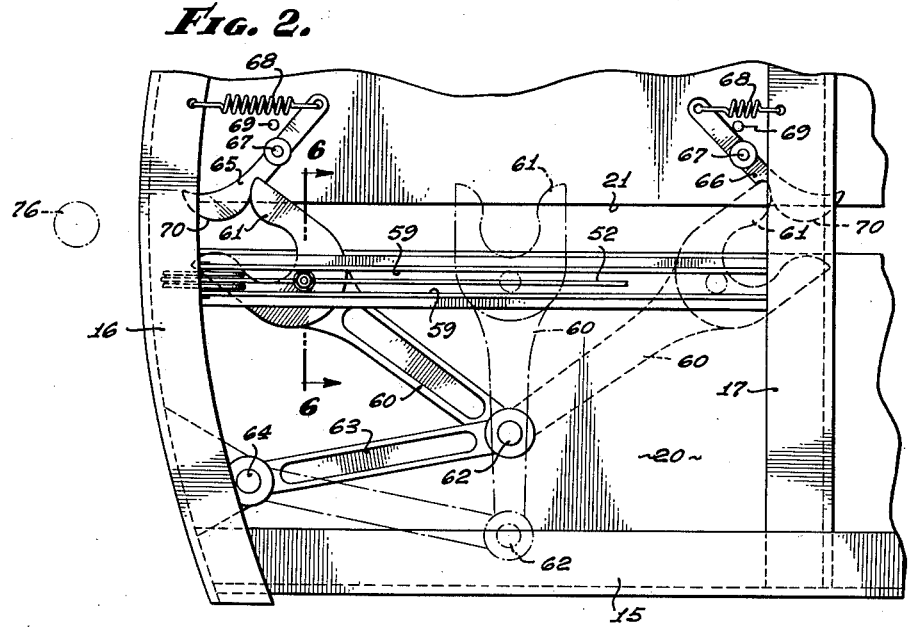
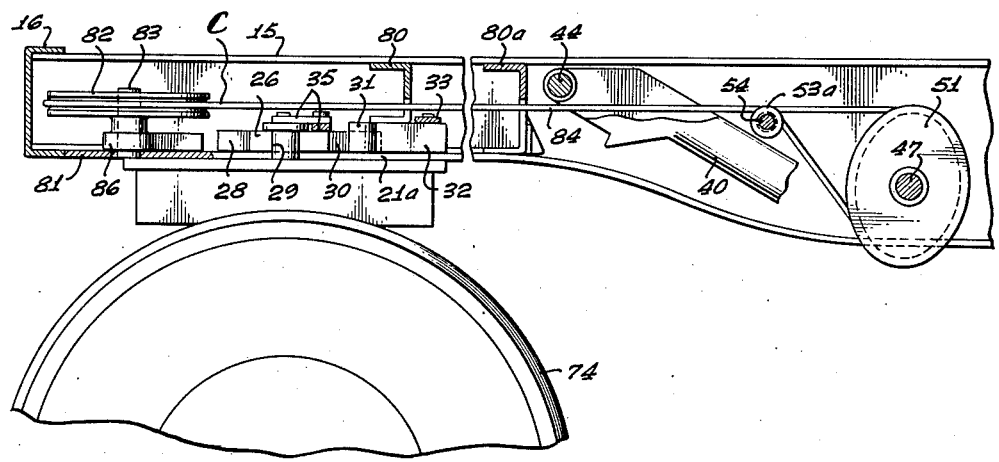

Oct. 8, 1957   W. E. MILLER   2,809,054
COUPLING AND RETRACTABLE TRAILER SUPPORT
AND ACTUATING MEANS THEREFOR
Filed Nov. 22, 1954   4 Sheets-Sheet 3
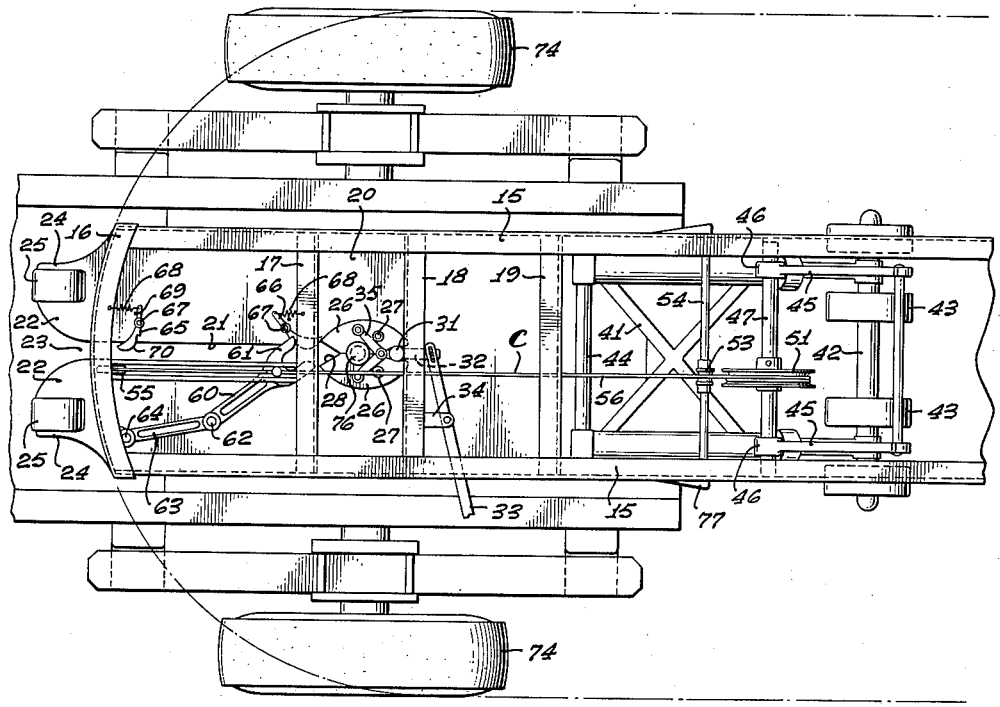
FIG. 4.
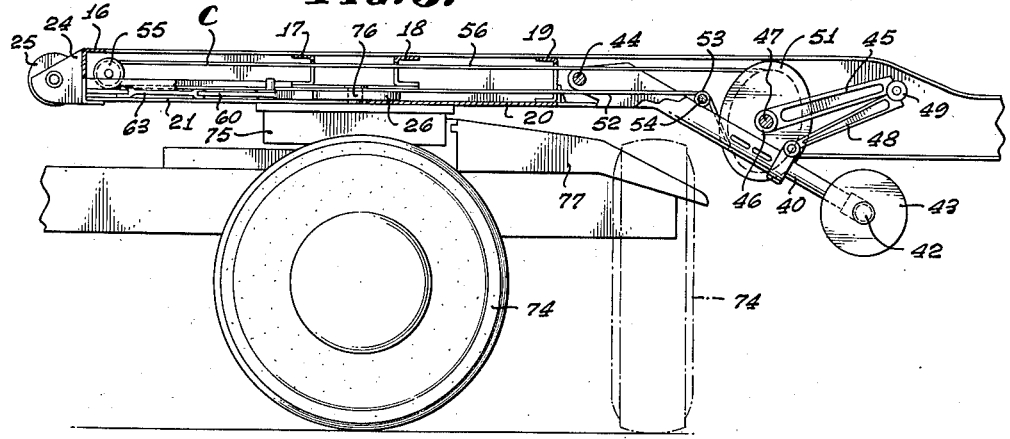
FIG. 5.
INVENTOR.
WELLINGTON E. MILLER
BY
ATTORNEY.

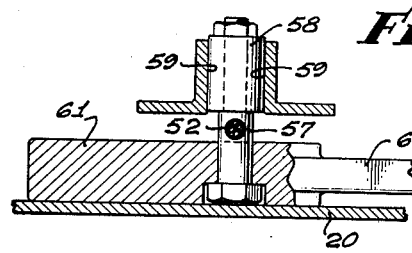
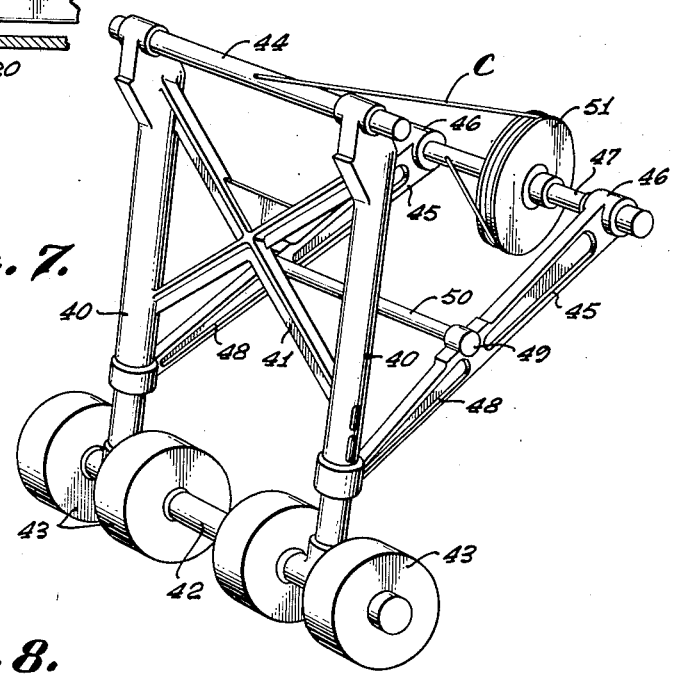
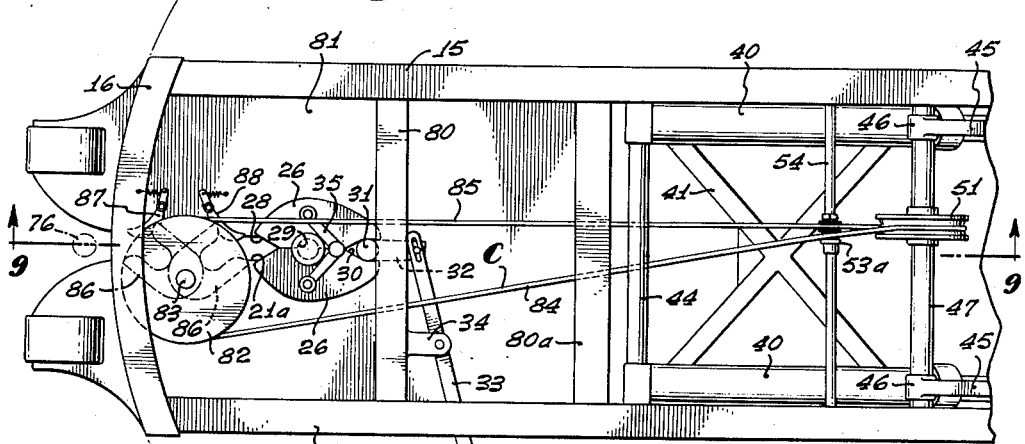

United States Patent Office 2,809,054
Patented Oct. 8, 1957

2,809,054

COUPLING AND RETRACTABLE TRAILER SUPPORT AND ACTUATING MEANS THEREFOR

Wellington E. Miller, Eagle Rock, Calif., assignor to Kay-Brunner Steel Products, Inc., a corporation of Delaware Application November 22, 1954, Serial No. 470,341

12 Claims. (Cl. 280—429)

My invention relates to tractor-semi-trailer combinations wherein the trailer can, through a fifth wheel structure, be coupled to or uncoupled from the tractor by movement of the tractor toward or away from the trailer, and in which a supporting gear for the front end of the trailer is movable automatically to a retracted position under coupling movement of the tractor, and to an extended position through uncoupling movement of the tractor to support the front end of the trailer when the tractor is disconnected therefrom.

More particularly, my invention relates to that type of tractor-semi-trailer combination in which a part of the fifth wheel structure including the king-pin is mounted on the tractor, and another part of the fifth wheel structure is mounted on the trailer which is operable to couple the king-pin to the trailer under movement of the tractor toward the trailer, and wherein the supporting gear is operable by movement of the king-pin during the coupling operation to occupy a retracted position, and during the uncoupling operation to occupy an extended position.

It is a purpose of my invention to provide a tractor-semi-trailer combination of the above-described character in which a cable mechanism is operable by the king-pin in its movement to coupling and uncoupling positions, to automatically move the supporting gear to retracted and extended positions.

It is also a purpose of my invention to provide a cable mechanism which is operable to retard movement of the supporting gear as it approaches extended or retracted position in order to prevent possible damage of its parts, but what is more important to prevent rebounding of the gear from either the retracted or the extended position when once moved to either position.

A further purpose of my invention is to provide a king-pin-operated member for actuating the cable mechanism, which is mounted on the trailer to be moved to either of two extreme positions by and according as the king-pin is moved rearwardly or forwardly on the trailer, and latches for securing the member in either of the two extreme positions so as to prevent accidental movement of the cable mechanism, and, hence, accidental movement of the supporting gear from either extended or retracted position. Since during the coupling and uncoupling operations of the tractor to the trailer the king-pin is moved very rapidly, the actuating member if permitted to move at the same speed would damage the cable mechanism and the latches. To prevent this, the actuating member is so mounted on the trailer that its speed of movement by the king-pin at the beginning and end of its stroke in either direction is made considerably less than that of the king-pin.

Another purpose of my invention is to provide another form of cable mechanism and king-pin actuator therefor which are characterized by their structural simplicity and compactness to occupy a minimum space at the front end of the semi-trailer, and to be more readily installed.

Another purpose of my invention is the provision of a supporting gear which includes wheel-carrying legs, and brace members therefor so mounted on the trailer that when the two are in extended position they are past vertical dead center positions to insure retention of the gear in extended position.

I will describe only two forms of coupling and retractable trailer support and actuating means therefor, each embodying my invention, and will then point out the novel features thereof in claims.

In the accompanying drawings:

Fig. 2 is an enlarged fragmentary view of Fig. 1 more particularly showing the successive stages of movement of the operating lever for the cable mechanism.

Fig. 4 is a view similar to Fig. 1 but showing the rear end of a tractor extended beneath the forward end of the trailer, the king-pin of the tractor coupled to the trailer, and the supporting gear in retracted position.

Fig. 5 is a central vertical sectional view of the semi-trailer as shown in Fig. 4, but with the rear end of the tractor in side elevation.

Fig. 6 is an enlarged sectional view taken on the line 6—6 of Fig. 2.

Fig. 7 is an enlarged detailed perspective view of the supporting gear, and a portion of the cable mechanism for operating the same.

Fig. 8 is a view similar to Fig. 4 showing another form of cable operating mechanism for the supporting gear, and another form of actuator for the mechanism.

Fig. 9 is a longitudinal sectional view taken on the line 9—9 of Fig. 8.

Figure 1:
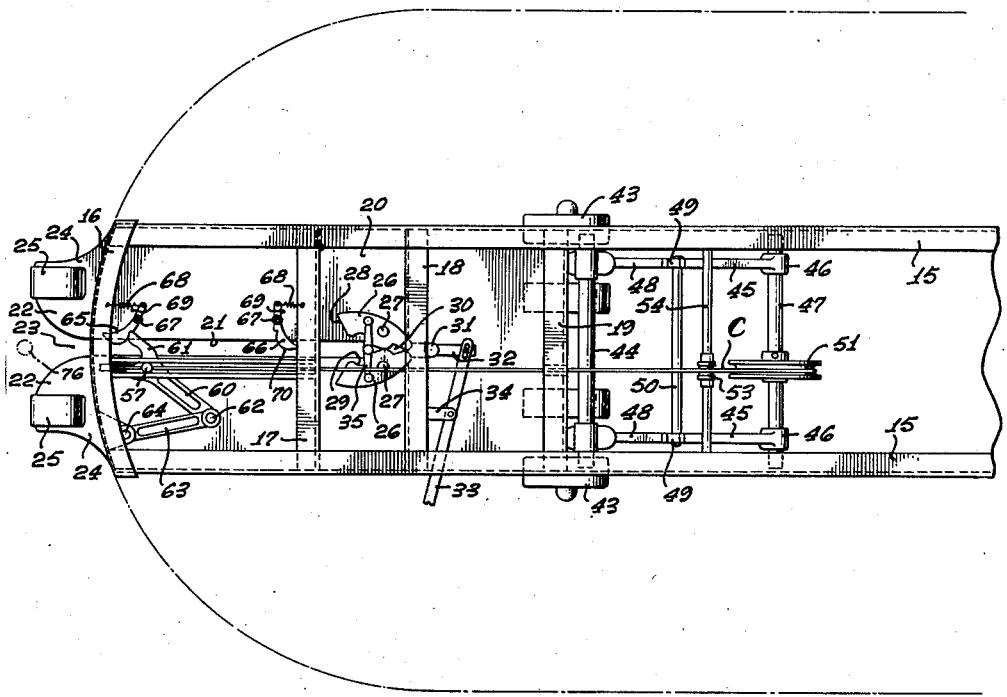
Fig. 1 is a view showing in fragmentary top plan the chassis of a semi-trailer having applied thereto one form of supporting gear for the front end of the trailer, one form of operating mechanism therefor, and one form of king-pin coupling means, all of which are in positions following an uncoupling operation or preceding a coupling operation.

Referring more particularly to the drawings and to the form of my invention shown in Figs. 1 to 7, 15 designates the parallel side beams of the frame of a semi-trailer of the type in which it is provided at its rear end only with wheels (not shown). The side beams are connected by a front curved beam 16 and cross beams 17, 18 and 19, the beams 17 and 18 being at a level slightly above that of the beam 19. A plate or platform 20 is secured to and spans the beams 16, 17 and 18, and this plate is formed at its longitudinal center with a slot 21. A pair of extensions 22 are formed on the forward edge of the plate 20 to project forwardly from the beam 16, and the confronting edges of these extensions are curved to provide a flared entrance 23 to the forward end of the slot 21. Brackets 24 are associated with the beam 16 and the extensions 22, and rollers 25 are mounted in the brackets.

A king-pin locking device which constitutes that part of the fifth wheel carried by the semi-trailer, is mounted on the plate 20 at the rear end of the slot 21. This device comprises a pair of jaws 26 pivoted on pins 27 to occupy open and closed positions, and having their forward ends bevelled inwardly at 28 and leading to semi-circular recesses 29 at the confronting edges of the jaws. To the rear of these recesses the jaw edges are further formed with angular recesses 30 in which, when the jaws are in closed position, a locking pin 31 is receivable to secure the jaws in closed position. This pin 31 is carried by one end of a member 32 which is movable by a lever 33 fulcrumed on a bracket 34 to cause the pin to occpy the locking position shown in Fig. 4, or the released position shown in Fig. 1. The jaws 26 are operatively connected one to the other by a toggle joint 35 so arranged that when a king-pin is extended between the jaws the joint will be actuated by the pin to swing the jaws to closed position and thus secure the pin therebetween.

As usual in such tractor-semi-trailer combinations the trailer frame is provided with a supporting gear for supporting the forward end of the trailer when the tractor is disconnected therefrom. The supporting gear of my invention comprises a pair of telescopic legs 40 braced in parallel spaced relation by struts 41, and carrying at their lower ends a cross axle 42 upon which wheels 43 are mounted. The upper ends of the legs 40 are pivoted on an axle 44 secured at its ends in the side beams 15 so that the legs can swing about the axle to occupy the extended position shown in Fig. 3 or the retracted position shown in Fig. 5.

The mechanism for moving the legs 40 to either of the aforesaid positions comprises a pair of arms 45 provided with sleeves 46 fixed to a cross shaft 47 journalled at its ends in the side beams 15. To the other end of these arms a pair of links 48 are pivotally connected by hinges 49 on the ends of a rod 50, the hinges being of such construction as to allow folding of the links on the arms when the legs 40 are in retracted position, but to hold the links in longitudinallly alined positions with respect to the arms when the legs are in extended position and to thus form braces for the legs.

Figure 3:
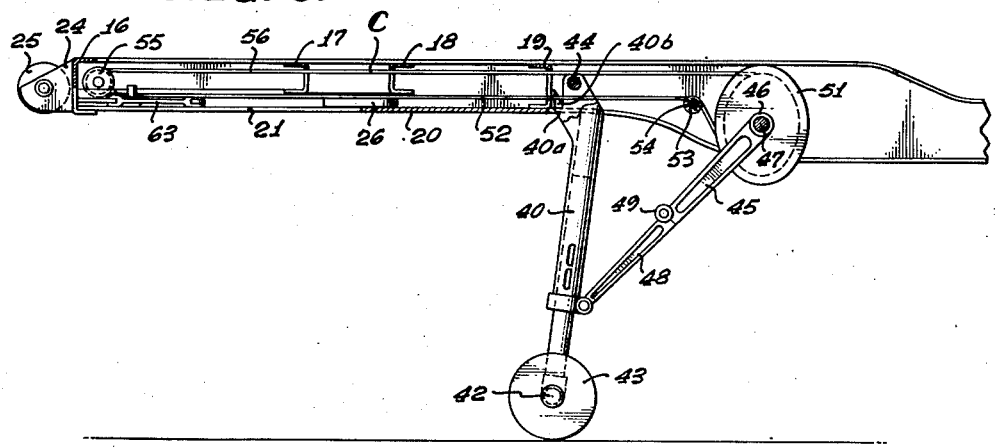
Fig. 3 is a central vertical sectional view of Fig. 1.

For rotating the shaft 47 to actuate the arms 45 for moving the legs 40 to extended or retracted position, a pulley 51 of elliptical form is fixed on the shaft 47 in the circumferential position shown in Fig. 3 so that when the legs are extended or retracted the major axis of the pulley is substantially vertical. This pulley 51 is adapted to be rotated in either direction by a cable C which is looped around the pulley and anchored thereto at the front minor axis thereof. From the pulley the lower stretch 52 of the cable C passes over an idle pulley 53 rotatable on a cross rod 54, and then forwardly through the beam 19 and beneath the beams 17 and 18 where it is extended around a pulley 55 mounted on the rear side of the front beam 16. The upper stretch 56 of the cable extends rearwardly from the pulley 55 through the beams 17, 18 and 19 and then downwardly around the pulley 51.

The actuator for the afore-described cable mechanism comprises a pin 57 in the form of a bolt (see Fig. 6), through which the lower cable stretch 52 extends and to which it is secured. This pin is provided with a roller 58 which is received in a slideway 59 composed of two angle bars secured at their ends to the beams 16 and 17 and paralleling the slot 21. The lower end of the pin 57 provides a fulcrum for a lever 60 having a U-shaped yoke 61 on one end thereof. The opposite end of the lever is pivoted as at 62 to one end of a link 63 pivoted as at 64 on the front beam 16.

The yoke 61 is at all times positioned above the slot 21 to be engaged by a king-pin on a tractor and moved thereby to occupy the forward extreme position shown in Fig. 1 or the rear extreme position shown in Fig. 4, and since the lever 60 is connected to the cable C through the pin 57, such lever and yoke constitute an actuator for the cable, and, hence, for the pulley 51 to move the legs 40 to extended or retracted position according as the yoke occupies one extreme position or the other.

To prevent accidental rotation of the pulley 51 through movement of the cable C and thus insure retention of the supporting gear in extended or retracted position, two latching pawls 65 and 66 are pivoted as at 67 on the plate 20 so as to be positioned adjacent the two extreme positions of the yoke 61. These pawls are by springs 68 urged to a latching position defined by stop pins 69, and cams 70 are formed on the pawls to be engaged by the king-pin for moving the pawls to released position.

In the operation of this form of my invention all parts thereof occupy the position shown in Figs. 1, 2 and 3 when the trailer is ready to be coupled to a tractor, the supporting gear being in extended position to support the front end of the trailer. This gear is securely held in extended position because the legs 40, the arms 45 and the links 48 are all forward of vertical dead center positions. Moreover, the arms and links are extended in longitudinal alinement with the hinges 49 locked to effectively brace the legs against rearward swinging movement. The legs 40 as extended have shouldered projections 40a which abut stops 40b on the beam 19. Additionally, the supporting gear is secured against possible retracting movement through accidental rotation of the pulley 51 by the cable C since the cable is locked against movement by the lever 60 because the yoke 61 is latched in its forward position by the forward pawl 65.

To couple the trailer to the rear end of a tractor supported on wheels 74 and provided with a conventional fifth wheel part 75 having an upstanding king-pin 76 and a rearwardly bifurcated ramp 77, the tractor is backed toward the trailer so as to cause the ramp to engage the rollers 25 and thus lift the front end of the trailer to allow the part 75 to pass therebeneath and the king-pin into the forward end of the slot 21. As the king-pin travels rearwardly in the slot, it first engages the cam 70 of the pawl 65 to move the latter and release the yoke 61. This is followed by the pin moving between the arms of the yoke 61.

Under continued rearward movement of the king-pin the yoke is forced rearwardly from its forward extreme to the rearward extreme position shown in Fig. 4 whereupon the king-pin passes out of the yoke and into the open jaws 26 where it strikes and folds the toggle joint 35 to close the jaws on the king-pin. This is followed by manual operation of the lever 33 to move the locking pin 31 between the jaws whereby they are locked in closed position, and thus the trailer is securely coupled to the tractor. As the king-pin moves out of the yoke 61 just before passing between the jaws 26, it engages the cam 70 of the pawl 66 throwing the latter to a position from which it is returned by the spring 68 to engage the yoke and latch the same in this position.

Because the yoke 61 is, through the lever 60 and the pin 57 operatively connected to the cable C, rearward movement of the yoke by the king-pin 76 is transmitted to the lower cable stretch 52, and in a reverse direction to the upper stretch 56. Such cable movement operates to rotate the pulley 51 in a counterclockwise direction as viewed in Fig. 3, thereby moving the supporting gear to the retracted position shown in Fig. 5 in which the legs 40 are elevated sufficiently to clear the tractor wheels 74 even when they are turned to the right angular position shown in broken lines in Fig. 5.

Since the pulley 51 is of elliptical form, and in the position shown in Fig. 3 has its major axis substantially vertical, when it is rotated by the cable C to retract the supporting gear, it moves the gear relatively slow at the start of the stroke because of the maximum leverage provided by the major axis of the pulley in relation to the shaft 44. As the pulley turns so that its minor axis becomes effective in relation to the shaft 44 retracting movement of the gear is accelerated and continues to be until it approaches its upper position where the major pulley axis again beocmes effective to decelerate gear movement and thus the gear is moved relatively slow into its fully retracted position.

This manner of movement of the supporting gear is for the purpose of preventing the rapid movement of the king-pin during the coupling operation from being transmitted to the gear and damaging the gear parts, but what is more important it prevents the gear rebounding from its retracted position or from its extended position when moved thereto in the uncoupling operation of the tractor from the trailer since in this reverse movement of the gear it is controlled by the pulley in the same manner as when moving the gear to retracted position.

This manner of movement of the supporting gear is amplified or augmented through the mode of operation of the arms 45 and the links 48 by the pulley 51, since it will be clear that the links fold and unfold on the arms as the supporting gear is moved to extended or retracted position.

For example, with the arm 45 and link 48 alined as shown in Fig. 3, initial movement of the arm 45 to retract the gear will cause the free end of the arm to swing on the axis of the shaft 47. This free end of the arm will move a substantial distance arcuately, but due to the angular position of the arm with respect to the retractive movement of the gear will be at a relatively slow rate and the amount of movement will be relatively small.

Upon further movement of the arm in the retracting direction the free end of said arm will move rearwardly an amount substantially equal to the arcuate movement thereof so that the gear will be more rapidly retracted and the amount of retraction will be substantially great. From this point to the fully retracted position of the arm 45 the rate of movement of the gear and the amount of movement will be relatively small.

As will be clear from a consideration of Fig. 2, the latch pawls 65 and 66 operate to secure the yoke 61 in either of its two extreme positions so as to prevent accidental movement of the cable C and, hence, unintended movement of the supporting gear from either extended or retracted position when once moved to either position. To control movement of the yoke 61 by the king-pin 76 both in coupling and uncoupling operations so as not only to turn the yoke about the pin 57 as it moves in one direction or the other along the slot 21, but to vary its movement in the same manner as described in connection with the movement of the supporting gear by the pulley 51, and for the purpose of amplifying such gear movement, the lever 60 and link 63 are provided and function as follows:

As the yoke 61 is moved by the king-pin rearwardly from its forward extreme position the lever 63 is turned on its fulcrum 57 from the acute angular position with relation to the slideway 59, as shown in Fig. 2, to the right angle position shown in broken lines in the same figure, and finally to the opposite acute angular position likewise shown in broken lines. The lever is caused to successively occupy these positions under movement of the king-pin because the link 63, since it is pivoted on the beam 16 and pivotally connected to the adjacent end of the lever, allows the pivot 62 to shift laterally in response to swinging movement of the lever about its fulcrum. As a consequence, movement of the yoke from the forward acute angular position toward the right angle position is slow in comparison to the movement of the king-pin, but as it approaches the right angle position its movement is accelerated and with it the pin 57, and so continues until it approaches the rear acute angular position when its movement is decelerated. This results in a corresponding movement of the cable to turn the pulley 51 in a like manner.

To uncouple the trailer from the tractor it is, of course, first necessary to remove the lock pin 31 from between the jaws 26 whereupon by moving the tractor away from the trailer the king-pin 76 moves forwardly in the slot 21 first opening the jaws 26 and then engaging and moving the pawl 66 to release the yoke 61. This is followed by the king-pin moving into the yoke and forcing the latter forwardly to its forward extreme position where it is again relatched by the pawl 65 and turned so that the king-pin can pass outwardly thereof and from the slot 21.

During its forward movement of the yoke 61 motion is imparted to the fulcrum pin 57 thereby actuating the cable C to rotate the pulley 51 in a clockwise direction as when viewed in Fig. 5, thereby moving the supporting gear to extended position. Since the manner of movement of the yoke 61 to its forward extreme position is the same as when moving rearwardly, the operation of the cable C is likewise controlled to rotate the pulley 51 accordingly. Thus the supporting gear starts and stops slowly in its movement to extended position with an intermediate accelerated movement.

Referring now to Figs. 8 and 9, I have here shown another form of my invention which is identical to the first form insofar as the trailer chassis and supporting gear is concerned, except two cross beams 80 and 80a are employed with a plate 81 spanning and fixed to the beams 16 and 80 and provided with a longitudinal slot 21a opening to the forward end of the trailer. The same elliptical pulley 51 is employed and the same jaws 26, locking pin 31 and lever 33 for operating the pin.

The major difference in the two forms is that the second form has a different actuating means for the cable C which comprises a pulley 82 of relatively large diameter which is rotatable about a vertical pintle 83 mounted in the plate 81 at one side of the slot 21a and in advance of the jaws 26, and about which the cable C is trained and anchored thereto. From the pulley 82 one stretch 84 of the cable extends rearwardly and beneath a double idle pulley 53a and then upwardly over the top side of the pulley 51. The other stretch 85 of the cable extends rearwardly from the pulley 82, beneath the pulley 53a and around the bottom side of the pulley 51.

The cable-actuating means also includes a bifurcated yoke 86 which is fixed to the pintle 83 and rotatable to occupy the advanced position shown in broken lines in Fig. 8 or the retracted position shown in dotted lines in the same figure. In either of these positions the yoke is adapted to be latched by two spring-pressed pawls 87 and 88 mounted on the plate 81 and which are identical to the pawls 65 and 66.

In operation of this form of my invention to couple the trailer to the tractor, the yoke 86 occupies the advanced position to receive the king-pin 76 as it enters the slot 21a and after such pin has swung the pawl 87 to release the yoke. Under continued rearward movement of the king-pin it swings the yoke 86 to the retracted position and then passes out of the yoke and between the jaws 26 (which it will be assumed have been previously opened) to engage the toggle joint 35 and close the jaws. Following this the jaws are locked in closed position by moving the pin 31 between the jaws through operation of the lever 33.

Under the afore-described movement of the yoke 86 the pulley 82 is rotated in a clockwise direction as when viewed in Fig. 8 to actuate the cable C so as to turn the pulley 51 in a counterclockwise direction as when viewed in Fig. 9. Through such rotation of the pulley 51 the supporting gear is moved from extended position to retracted position and in the same manner as described in connection with the supporting gear in the first form of my invention.

To uncouple the tractor from the trailer the jaws 26 are first unlocked so that under forward movement of the tractor the king-pin 76 is moved forwardly in the slot 21a to open the jaws, release the yoke 86 by moving the pawl 88, then moving into the yoke and turning the latter from the retracted position to the advanced position in which it is again latched by the pawl 87. The king-pin in moving the yoke to the advanced position rotates the pulley 82 in a counterclockwise direction thereby moving the cable C to rotate the pulley 51 in a clockwise direction as when viewed in Fig. 9. Under such rotation of the pulley 51 the supporting gear is moved to extended position to support the front end of the trailer after the tractor has been removed therefrom. It will be understood that the pawls 87 and 88 function to secure the yoke against movement in either direction so as to prevent accidental rotation of the pulley 51 and to thereby maintain the supporting gear in either extended or retracted position.

Although I have herein shown and described only two forms of coupling and retractable trailer support and actuating means therefor, each embodying my invention, it is to be understood that various changes and modifications may be made therein without departing from the spirit of the invention and the spirit and scope of the appended claims.

What I claim is:

1. A semi-trailer having a supporting gear mounted on the forward portion thereof for swinging movement to occupy a retracted position and an extended position; a longitudinal slot opening to the front end of said trailer and in which a tractor-carried king-pin is adapted to move rearwardly and forwardly according as the tractor is moved toward and away from said trailer; a pair of jaws fixed at the rear end of said slot and pivoted to occupy an open position to receive therebetween the king-pin when moved to the rear end of said slot, and a closed position in which the king-pin is retained therebetween; jaw-closing means responsive to movement of the king-pin between said jaws; releasable means for locking said jaws in closed position; a slideway paralleling said slot, a member movable lengthwise in the slideway; a lever fulcrumed on the member and having a portion thereof positioned in said slot to be moved from an advanced position at the forward end of said slot to a retracted position at the rear portion of said slot by and according as the king-pin moves rearwardly or forwardly in said slot thereby effecting corresponding movement of the member in the slideway; and an operative connection between the member and the supporting gear for moving the latter to retracted or extended position according as the member is moved rearwardly or forwardly in said slot.

2. A semi-trailer having a supporting gear mounted on the forward portion thereof for swinging movement to occupy a retracted position and an extended position; a longitudinal slot opening to the front end of said trailer and in which a tractor-carried king-pin is adapted to move rearwardly and forwardly according as the tractor is moved toward and away from said trailer; a pair of jaws fixed at the rear end of said slot and pivoted to occupy an open position to receive therebetween the king-pin when moved to the rear end of said slot, and a closed position in which the king-pin is retained therebetween; jaw-closing means responsive to movement of the king-pin between said jaws; releasable means for locking said jaws in closed position; a slideway paralleling said slot, a member movable lengthwise in the slideway; a lever fulcrumed on the member and having a portion thereof positioned in said slot to be moved from an advanced position at the forward end of said slot to a retracted position at the rear portion of said slot by and according as the king-pin moves rearwardly or forwardly in said slot thereby effecting corresponding movement of the member in the slideway; and a cable mechanism operatively connected to the member and the supporting gear for moving the latter to retracted or extended position according as the member is moved rearwardly or forwardly in said slot.

3. A semi-trailer having a supporting gear mounted on the forward portion thereof for swinging movement to occupy a retracted position and an extended position; a longitudinal slot opening to the front end of said trailer and in which a tractor-carried king-pin is adapted to move rearwardly and forwardly according as the tractor is moved toward and away from said trailer; a pair of jaws fixed at the rear end of said slot and pivoted to occupy an open position to receive therebetween the king-pin when moved to the rear end of said slot, and a closed position in which the king-pin is retained therebetween; jaw-closing means responsive to movement of the king-pin between said jaws; releasable means for locking said jaws in closed position; a slideway paralleling said slot, a member movable lengthwise in the slideway; a lever fulcrumed on the member and having a portion thereof positioned in said slot to be moved from an advanced position at the forward end of said slot to a retracted position at the rear portion of said slot by and according as the king-pin moves rearwardly or forwardly in said slot thereby effecting corresponding movement of the member in the slideway; and a cable mechanism operatively connected to the member and the supporting gear for moving the latter to retracted or extended position according as the member is moved rearwardly or forwardly in said slot, said mechanism including means operable to retard movement of the supporting gear as it approaches either of said positions.

4. A semi-trailer having a supporting gear mounted on the forward portion thereof for swinging movement to occupy a retracted position and an extended position; a longitudinal slot opening to the front end of said trailer and in which a tractor-carried king-pin is adapted to move rearwardly and forwardly according as the tractor is moved toward and away from said trailer; a pair of jaws fixed at the rear end of said slot and pivoted to occupy an open position to receive therebetween the king-pin when moved to the rear end of said slot, and a closed position in which the king-pin is retained therebetween; jaw-closing means responsive to movement of the king-pin between said jaws; releasable means for locking said jaws in closed position; a slideway paralleling said slot, a member movable lengthwise in the slideway; a lever fulcrumed on the member and having a portion thereof positioned in said slot to be moved from an advanced position at the forward end of said slot to a retracted position at the rear portion of said slot by and according as the king-pin moves rearwardly or forwardly in said slot thereby effecting corresponding movement of the member in the slideway; and a cable mechanism operatively connected to the member and the supporting gear for moving the latter to retracted or extended position according as the member is moved rearwardly or forwardly in said slot, said mechanism including an elliptical pulley operable to retard movement of the supporting gear as it approaches either of said positions.

5. A semi-trailer having a supporting gear mounted on the forward portion thereof for swinging movement to occupy a retracted position and an extended position; a longitudinal slot opening to the front end of said trailer and in which a tractor-carried king-pin is adapted to move rearwardly and forwardly according as the tractor is moved toward and away from said trailer; a pair of jaws fixed at the rear end of said slot and pivoted to occupy an open position to receive therebetween the king-pin when moved to the rear end of said slot, and a closed position in which the king-pin is retained therebetween; jaw-closing means responsive to movement of the king-pin between said jaws; releasable means for locking said jaws in closed position; a slideway paralleling said slot, a member movable lengthwise in the slideway; a lever fulcrumed on the member and having a portion thereof positioned in said slot to be moved from an advanced position at the forward end of said slot to a retracted position at the rear portion of said slot by and according as the king-pin moves rearwardly or forwardly in said slot thereby effecting corresponding movement of the member in the slideway, two means for latching the lever in either of said positions, said means urged to latching position in which they are disposed in the path of movement of the king-pin so as to be actuated thereby to move first one means to releasing position and then the other means according as the king-pin moves to the forward portion of said slot or to the rear portion thereof.

6. In a semi-trailer adapted to be connected to a tractor having a king-pin, said trailer having a supporting gear mounted for swinging movement between a retracted position and an extended position; a longitudinal guide at the forward end of said trailer in which said king-pin is slidable rearwardly and forwardly according as the tractor is moved toward and away from said trailer; releasable coupling means adjacent the rear end of said guide for releasably securing said king-pin; and mechanism for operating the supporting gear, said mechanism including a part operably associated with said guide for actuation by said king-pin as the latter moves in said guide to thereby move the supporting gear, said part being so constructed and arranged as to effect movement of said supporting gear at an accelerated rate through an intermediate portion of the range of movement thereof, said mechanism also having means correlated with said part for augmenting the movements said part imparts to the supporting gear.

7. In a semi-trailer adapted to be connected to a tractor having a pin, said trailer having a supporting gear mounted for swinging movement between a retracted position and an extended position; a longitudinal guide at the forward end of said trailer in which said pin is slidable rearwardly and forwardly according as the tractor is moved toward and away from said trailer; releasable coupling means at the rear end of said guide for releasably securing said pin; and a slideway paralleling said guide; a member movable longitudinally in the slideway; an articulated lever mechanism including a lever fulcrumed on the member and having a portion thereof positioned in said guide and adapted to be engaged by said pin for movement from a position at the forward end of said guide to a retracted position adjacent the rear portion of said guide as said pin moves rearwardly in said guide; and an operative connection between the member and supporting gear for moving the latter between retracted and extended positions.

8. In a semi-trailer adapted to be connected to a tractor having an engageable member, said trailer having a supporting gear mounted on the shaft for swinging movement between a retracted position and an extended position; a guide at the forward end of said trailer in which said member is slidable rearwardly and forwardly according as the tractor is moved toward and away from said trailer; releasable coupling means at the rear end of said guide for releasably securing said member; and cable mechanism for operating the supporting gear, said cable mechanism including a part operably associated with said guide adapted to be engaged by said member for actuation as said member moves in said guide to thereby move the supporting gear, said cable mechanism also including a shaft, an elliptical pulley fixed on the shaft, and a cable so trained around said pulley and so connected to said part that when said gear is in either of said positions the major axis of said pulley is substantially vertical whereby, when said pulley is turned by the cable, movement of said gear will be retarded as it approaches either of said positions.

9. In a semi-trailer adapted to be connected to a tractor having an engageable member, said trailer having a supporting gear mounted for swinging movement between a retracted position and an extended position; a guide at the forward end of said trailer in which said member is movable to rear and forward positions according as the tractor is moved toward and away from said trailer; releasable coupling means at the rear end of said guide for releasably securing said member; cable mechanism for operating the supporting gear, said cable mechanism including a part so associated with said guide as to be moved by said member from a forward position to a rear position or vice versa according as said member occupies corresponding positions and to thereby move the supporting gear to retracted or extended position; and two means for latching said part in either of said positions, said means urged to latching position in which they are disposed in the path of movement of said member so as to be actuated thereby to move first one means to releasing position and then the other means according as said member moves to rear or forward position.

10. A semi-trailer having a supporting gear for the front end thereof comprising legs pivoted to occupy extended and retracted positions; a shaft; crank arms fixed to the shaft; links pivoted to the legs and hingedly connected to said arms; and means for rotating the shaft in one direction to turn said arms from an elevated position to a lowered position in which they are disposed in alinement with the links, and wherein the links and arms are past a vertical dead center position, and the legs moved to extended position and past a vertical dead center position whereby the supporting gear is moved to extended position, said means also operable to rotate the shaft in the other direction to actuate said arms and links for moving the supporting gear to retracted position, said means including an elliptical pulley fixed to the shaft, and a cable extending about the periphery of the pulley for rotating the latter, said pulley so arranged circumferentially on the shaft that movement of the supporting gear from extended position to retracted position or vice versa is retarded as it approaches either of said positions.

11. In a semi-trailer adapted to be connected to a tractor having an engageable member, said trailer having a supporting gear mounted for swinging movement between a retracted position and an extended position; a guide at the forward end of said trailer in which said member is movable to rear and forward positions according as the tractor is moved toward and away from said trailer; releasable coupling means at the rear end of said guide for releasably securing said member; and mechanism for operating the supporting gear, said mechanism including a rotatable element operatively associated with said guide so as to be rotated to one extreme position or another by said member according as the latter moves in one direction or the other in said guide, a pulley fixed to said element for rotation thereby, a shaft, an elliptical pulley fixed on said shaft, and a cable operatively connecting said pulleys whereby, according as said element is rotated to one extreme position or the other said gear will be moved to retracted or extended position, the elliptical pulley so arranged circumferentially on said shaft that under rotation thereof by the first-mentioned pulley said gear will be moved at a relatively rapid rate through an intermediate portion of its range of movement and at a relatively slow rate through the terminal portions of its range of movement.

12. In a semi-trailer as embodied in claim 11 wherein two means are provided for latching said element in either of said positions, said means urged to latching position in which they are disposed in the path of movement of said member so as to be actuated thereby to move first one means to releasing position and then the other means according as said member moves to the forward portion of said guide or to the rear portion thereof.

References Cited in the file of this patent

UNITED STATES PATENTS

| | | |
|---|---|---|
| 1,915,142 | Winn | June 20, 1933 |
| 2,028,400 | Land | Jan. 21, 1936 |
| 2,417,904 | Bennett | Mar. 25, 1947 |
| 2,471,555 | Bennett | May 31, 1949 |
| 2,522,740 | Bennett | Sept. 19, 1950 |